United States Patent [19]

Davis, Jr.

[11] 3,997,366

[45] * Dec. 14, 1976

[54] BATTERY SEPARATORS

[75] Inventor: Charles Davis, Jr., Warrensville Heights, Ohio

[73] Assignee: Union Carbide Corporation, New York, N.Y.

[ * ] Notice: The portion of the term of this patent subsequent to Sept. 16, 1992, has been disclaimed.

[22] Filed: Aug. 23, 1974

[21] Appl. No.: 499,934

Related U.S. Application Data

[63] Continuation-in-part of Ser. No. 290,815, Sept. 21, 1972, abandoned.

[52] U.S. Cl. .............................................. 429/144
[51] Int. Cl.² ......................................... H01M 2/16
[58] Field of Search .......... 136/131, 145, 146, 157, 136/158; 117/6, 75

[56] References Cited

UNITED STATES PATENTS

| | | | |
|---|---|---|---|
| 3,018,316 | 1/1962 | Higgins et al. | 136/157 |
| 3,092,509 | 6/1963 | Booth et al. | 136/145 |
| 3,114,651 | 12/1963 | Gentile | 117/6 |
| 3,246,767 | 4/1966 | Pall et al. | 136/145 |
| 3,905,851 | 9/1975 | Davis | 136/131 |

Primary Examiner—John H. Mack
Assistant Examiner—H. A. Feeley
Attorney, Agent, or Firm—Clement J. Vicari

[57] ABSTRACT

A battery separator is provided which is suitable for use in a variety of dry cell systems. The separator comprises a thin carrier of bonded Beta glass fibers coated with partially cross-linked polyacrylamide.

10 Claims, 2 Drawing Figures

U.S. Patent    Dec. 14, 1976    3,997,366
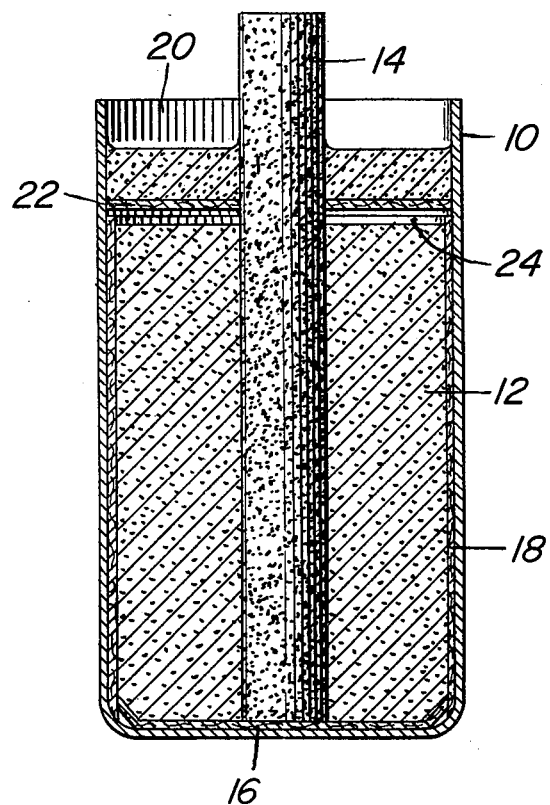
F I G. 1
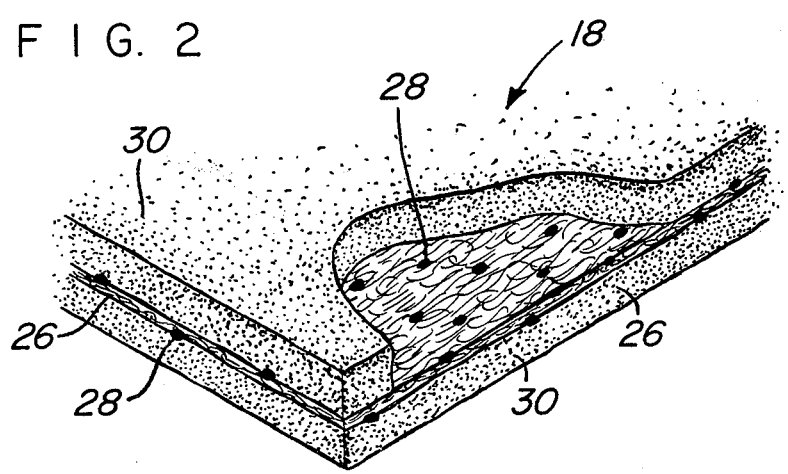
F I G. 2

BATTERY SEPARATORS

This application is a continuation-in-part of application Ser. No. 290,815 filed Sept. 21, 1972, now abandoned.

The present invention relates to electrochemical cells and, more particularly, relates to separators for batteries which comprise a fibrous carrier coated with a polymeric electrolyte-immobilizing material.

So-called "dry cells" are composed essentially of a consumable metal anode such as zinc, a cathode-depolarizer such as manganese dioxide and a suitable electrolyte. The familiar Leclanché dry cell, which is conventionally used as the power source in flashlights and other portable electric devices, comprises a zinc anode; a cathode-depolarizer containing manganese dioxide and a conductive material such as carbon black or graphite, and an electrolyte consisting of an aqueous solution of zinc chloride and ammonium chloride. Corrosion inhibitors such as mercuric chloride, or chromate salts, may also be used in relatively small amounts within the electrolyte. Other types of primary dry cell systems which have attracted considerable attention in recent years are systems such as the magnesium-manganese dioxide system and a variation of the Leclanché system wherein the electrolyte excludes ammonium chloride and consists entirely of an aqueous solution of zinc chloride.

The term "dry cell" signifies that most of the electrolyte of the cell is immobilized, a portion of the electrolyte being contained or absorbed by a layer of material interposed between the anode and cathode of the cell. This layer is generally referred to as the separator and is a physical member or structure which retains electrolyte solution and provides a means for maintaining the anode in working engagement with the cathode while maintaining physical separation between the anode and cathode.

In the art dry cell separators have been fabricated from gelatinous, paste-type materials formed from starch, flour, methyl cellulose, or other polymeric material, which because of their fragility are commonly supported by paper or similar carrier material. Although these carrier materials have been widely used, they are not without certain disadvantages in use, and substitutes have long been sought. For example, porous paper, the most commonly used carrier, degrades in the presence of acid electrolyte systems causing a breakdown in separation between anode and cathode, increased corrosion of the anode and resultant evolution of hydrogen gas, cell leakage and reduction of the cathode. Other carrier materials, for instance cloth, nonfibrous films, and mats of fibrous material including glass are more inert than paper but have other disadvantages for example, high electrical resistance.

As an example of the use of glass cloth as a carrier for electrolyte, reference is made to U.S. Pat. No. 2,853,537. In that patent there is disclosed a woven fiber glass mat impregnated with insolubilized polyvinyl alcohol which has an electrolyte absorbed therein. Two layers of the glass cloth (0.003 inch or 3 mils thick) are used and are impregnated with polyvinyl alcohol to produce a structure 0.009 inch ±0.001 inch thick. This structure is then soaked in aqueous electrolyte solution before use in a cell.

It is the principal object of the invention to provide an improved battery separator comprising a layer of electrolyte supported by a carrier which is inert to the electrolyte and cell reaction products.

The invention by means of which the object is attained will be described with reference to the accompanying drawings in which:

FIG. 1 is a vertical-section of a round dry cell employing a separator embodying the invention; and FIG. 2 is a sectionalized isometric view in greatly enlarged detail of a separator embodying the invention prior to its insertion in a dry cell.

The invention comprises a battery separator including a layer of electrolyte-immobilizing material and a carrier or support for such electrolyte layer. The carrier is composed of a thin, nonwoven, bonded glass fiber web about 1 to 3 mils in thickness, the overall average thickness of the separator including the electrolyte layer being about 2 to 7 mils. The electrolyte immobilizing layer is preferably composed of partially cross-linked polyacrylamide, and the carrier web is of silicate glass fibers known to the industry as "Beta" glass bonded together, for example with polyvinyl alcohol.

Referring now in detail to the drawings and, in particular to FIG. 1, there is shown a cylindrical primary dry cell comprising a zinc cup or can 10 comprising a cathode-depolarizer mix 12 which is positioned in the usual manner around a central carbon electrode rod 14 to form a conventional cell cathode. The cathode-depolarizer mix 12 rests on an insulating member 16 in bottom of the zinc cup 10 and is separated from the side walls thereof by a thin separator 18 embodying the invention.

The dry cell is provided with a top sub-seal 20 which may be made of wax or pitch poured while hot onto a washer 22 within the open end of the zinc cup 10. The sub-seal 20 and washer 22 are positioned above but spaced from the top of the cathode-depolarizer mix 12 to provide an air space 24 into which the mix may expand on discharge of the cell. It will, of course, be understood that the dry cell illustrated is merely representative of the basic cell structure and that many suitable constructions for closing and finishing the cell are available and known to those skilled in the art.

The cathode depolarizer mix 12 is made from a mix formulation containing finely particulate manganese dioxide depolarizer and acetylene black. The mix is wetted with the required amount of electrolyte, e.g., a solution of zinc chloride in water, to produce a workable mass. Optionally, minor amounts of conventional corrosion inhibitors such as mercuric chloride may be added to the mix formulation.

FIG. 2 is a greatly enlarged sectional view of the separator 18 of FIG. 1 showing in detail the structure of the separator. As can be seen from FIG. 2, a thin glass fiber carrier formed from fibers of Beta glass 26 held together by a binder 28 is coated on both sides with a layer of electrolyte-immobilizing material 30 such as partially cross-linked polyacrylamide, the carrier thus being embedded in the electrolyte-immobilizing material.

Each of the components of the cell of FIG. 1 of the drawings, except the separator 18, is conventional and known construction. The novelty of the cell resides in the separator structure and its method of fabrication.

As has been described above, the separator of the present invention is formed from two essential components, a glass fiber carrier and a coating material. Optionally, up to about 30% by weight of a filler or bulking agent may be present to improve the physical separation afforded by the separator.

Beta glass sheet, the preferred carrier material, is fabricated from very thin, silicate glass fibers having an average diameter of approximately 3.8 microns in approximately ¼ inch lengths and bonded with polyvinyl alcohol applied from a solution containing 2% to 3% by weight of polyvinyl alcohol. Sheets are formed in various thicknesses by conventional papermaking methods. For the purposes of the present invention, however, only sheets in the thickness range of about 1 to 3 mils are used. Beta glass fiber is produced and is commercially available from Owens-Corning Fiberglass Corp., New York, N.Y. and the sheets of Beta glass described above are available from Crane & Co. Inc., Dalton, Mass.

The material used to coat the Beta glass carrier to form the separator is a partially cross-linked ployacrylamide gel. These gels have been known and used in the art and their method of fabrication and use is described in the literature. U.S. Pat. No. 3,018,316 to Higgins et al. discloses that hydrophilic, partially cross-linked polyacrylamide gels are useful as separators in certain types of batteries. Copending U.S. application Ser. No. 252,510, filed on May 8, 1972 by the present inventor discloses a cross-linking method for polyacrylamide to form useful battery separators. This method involves partially cross-linking the polyacrylamide by adding to an aqueous solution of polyacrylamide a chromium-containing compound, wherein a major portion of the chromium is present at a valence other than +3, and a compound which will react with said chromium-containing compound to yield chromium ions at a valence of +3. These chromium ions at a valence of +3 initiate cross-linking of the polyacrylamide, which cross-linking proceeds at a controlled rate only as chromium ions at a valence of +3 become available.

This controlled cross-linking method is preferred for use to produce the separator of the invention, but other methods for cross-linking the polyacrylamide and coating the carrier are also useful. These include cross-linking by irradiation as well as other chemical methods of cross-linking.

The optional bulking or filler materials which may be added to the separator to improve physical separation include such materials as mineral silicates, cloth, or paper fibers etc. Particularly preferred are the mineral silicates since they are not subject to the degradation of paper and cloth which the present invention seeks to avoid. Such materials as talc, fibrous talc and asbestos, among others, are useful as bulking or filler materials. The ratio of bulking material to polyacrylamide is in the range of 5 to 1 to 10 to 1. Talc is the preferred bulking agent.

Since the separators of the present invention are intended for use in dry cells which may be comparatively small and yet must have an output which is sufficient to permit use in many diversified and sometimes demanding applications, the size of the separator layer is of extreme importance. If the separator is too thin, insufficient physical separation may be obtained and short circuiting of the cell could result. On the other hand, since the separator contains a large proportion of the electrolyte of the cell, too thin a separator layer may provide an insufficient amount of electrolyte to realize the full capacity of the cell. Again, if the separator layer is too thick, ion transport will be impeded, internal resistance within the cell will be increased and output will be reduced.

For the purposes of the present invention it is necessary therefore that both the glass carrier and the total separator thickness be maintained within narrow and critical ranges. On either side of the upper or lower limits of these ranges cell performance will be substantially impaired.

The glass fibers used to fabricate the separator carrier or substrate preferably have a diameter of 2 to 5 microns and an individual length of one sixteenth to one half inch. The most common commercially available Beta glass fibers have a diameter of 3.8 microns and are approximately ¼ inch in length on the average. These fibers are particularly preferred for use in the present invention.

Various binders can be used to hold the fibers in a thin, flat web. A binder solution containing about 2 to 3 weight percent polyvinyl alcohol is most commonly used but other binders may also be employed. For example, to reduce the number of different components employed in the separator, a small amount e.g., up to 5 weight percent, of polyacrylamide may be used to bind the glass fibers together prior to coating the carrier with the partially cross-linked polyacrylamide. The carrier, prior to coating, should have a thickness in the range of 1 to 3 mils and after coating it, the finished separator should have a thickness in the range of 3 to 7 mils. The thickness of the coated carrier is critical as above indicated, since if it is much in excess of 7 mils, internal resistance within the cell becomes quite high, and cell performance is substantially reduced The fabrication of a separator in accordance with the present invention and its incorporation into a dry cell follows substantially the procedure employed in manufacturing so-called "paper lined cells."

A Beta glass carrier formed by bonding 3.8 micron diameter and ¼ inch long glass fibers with a solution containing 2 to 3 percent by weight polyvinyl alcohol into a glass sheet having a thickness of approximately 2.3 mils is coated by a doctor blade with a separator-forming composition. This separator-forming composition may be, for example, in a zinc-manganese dioxide, zinc chloride cell:

| | |
|---|---|
| 5–7 weight percent aqueous zinc chloride solution | 76.97 percent by weight |
| potassium dichromate | 0.275 percent by weight |
| potassium thiocyanate | 0.275 percent by weight |
| P-250 Polyacrylamide | 3.00 percent by weight |
| talc | 16.95 percent by weight |
| corrosion inhibitors | 2.53 percent by weight |

This separator-forming mixture is similar to those described in previously mentioned copending application U.S. Ser. No. 252,510. In general, the molecular weight of the polyacrylamide useful in the present invention will range from less than 100,000 to greater than 10 or 20 million but preferably is in the range of 200,000 to 15 million. The most preferred separators for general purpose battery use have been made from a non-ionic homopolymer of acrylamide having a molecular weight of approximately 5 to 6 million. This is the material referred to above as P-250 Polyacrylamide and is generally commercially available under the tradename "Cyanamer" P-250 Polyacrylamide from American Cyanamid Company, Wayne, N.J. The amount of polyacrylamide useful in forming separators in accordance with the present invention will generally be between 1 and 20 percent by weight based on the total weight of the mixture excluding any bulking agents.

The separator-forming mixture is doctored onto the glass fiber carrier to a thickness of approximately 5 mils. The coating is applied as uniformly as possible to a quantity of about 70 to 100 milligrams per square inch of surface. Cross-linking of the polyacrylamide is initiated through reaction of the potassium dichromate and the potassium thiocyanate to yield chromium ions at a valence of +3. It is these chromium ions which induce the partial cross-linking of the polyacrylamide. After coating, the coated separator is heated to dry it. To attain desired properties in the separator, determined by inspection, it is then rewet with cell electrolyte. In this manner the desired degree of cross-linking can be controlled.

Fabrication of the battery from this point follows conventional battery technology in that the coated separator is handled in the same manner as coated paper separators of the prior art. Each of the other components of the cell may be identical to those of the prior art and the manner of assembly may follow the common and well-known assembly techniques whereby a cylindrical zinc can is first lined with the coated separator, an insulating member is positioned in the bottom of the can, cathode-depolarizer mix formulation is extruded into the can and a central carbon electrode is rammed into the center of the mix. The cell electrolyte is contained in the cathode-depolarizer mix and separator. However, if necessary additional electrolyte solution may be added atop the mix and the cell may be sealed in the conventional manner shown in FIG. 1 of the drawing.

It will be appreciated from the above description that the use of the separator of the present invention permits the battery manufacturer to take advantage of a new separator material possessing distinct advantages over those separators which were previously used and yet employ conventional cell forming and fabricating technology to produce his product.

EXAMPLE 1

A large number of cells have been prepared by the method described in which separators embodying the invention but having different compositions of electrolyte-immobilizing layer, different thickness of carrier and different quantities of coating were employed. Tests were made of such cells when freshly made and after storage at elevated temperatures for different periods of time. Cells embodying the invention were also compared against cells otherwise as similar as possible under laboratory conditions but containing separators using paper as the carrier for talc-filled polyacrylamide comparable to that used in the separators embodying the invention. The results of such tests are tabulated below.

Of the tests referred to, the "2.25 ohm LIF" test, a cell is discharged for 4 minutes per hour for 8 hours a day, the service to specific voltage cut-offs being measured in minutes. In the 25 ohm radio test the cell is discharged for 4 continuous hours each day to the cut-off voltage indicated and service is reported in hours.

TABLE I

Composition of Electrolyte-Immobilizing Separator Forming Mix — % by Weight in Solution*

| Mix | $H_2O$ | $ZnCl_2$ | Inhibitors | Polyacrylamide | Talc | KSCN |
|---|---|---|---|---|---|---|
| A | 68 & 5 | | 2.0 | 2.3 | 22 | .3 |
| B | 70 | 5 | 2.0 | 3.1 | 19 | .3 |
| C | 72 | 5.4 | 1.9 | 3.4 | 17 | .3 |
| D | 71 | 5.4 | 1.9 | 4.2 | 17 | .3 |
| E | 73 | 5.5 | 1.8 | 4.8 | 15 | .3 |

Composition of Electrolyte-Immobilizing Separator Layer — $mg/in^2$ in 100 $mg/in^2$ Layer*

| Mix | $ZnCl_2$ | Inhibitors | KSCN | Polyacrylamide | Talc |
|---|---|---|---|---|---|
| A | 16 | 6.4 | 0.9 | 7.1 | 68.6 |
| B | 17.7 | 6.7 | 1.0 | 10.5 | 63.0 |
| C | 19.3 | 6.7 | 1.1 | 12.0 | 59.8 |
| D | 18.7 | 6.7 | 1.1 | 14.5 | 58.0 |
| E | 20.0 | 6.7 | 1.1 | 17.7 | 53.3 |

*All compositions contain quantities of $K_2Cr_2O_7$ equal to those of KSCN.

TABLE II

Fresh Cell Performance With Separators and Under Conditions Shown

| Separator Carrier Thickness | Comp. | 2.25 Ohm LIF Min. Serv. To | | | 25 Ohm Radio Hr. Serv. To | | |
|---|---|---|---|---|---|---|---|
| | | 1.1v | 0.9v | 0.65v | 1.1v | 0.9v | 0.65v |
| 1.5 | A | 357 | 564 | 838 | 127 | 142 | 160 |
| 2 | A | 361 | 583 | 837 | 129 | 139 | 164 |
| 1.5 | B | 377 | 600 | 824 | 128 | 141 | 164 |
| 2 | B | 368 | 607 | 812 | 128 | 138 | 164 |
| 1.5 | C | 380 | 613 | 820 | 123 | 134 | 159 |
| 2 | C | 381 | 610 | 817 | 122 | 135 | 162 |
| 1.5 | D | 352 | 576 | 778 | 122 | 134 | 157 |
| 2 | D | 357 | 585 | 777 | 123 | 135 | 157 |
| 1.5 | E | 367 | 586 | 767 | 122 | 134 | 156 |
| 2 | E | 356 | 593 | 761 | 122 | 133 | 155 |

TABLE III

CELL TESTS COMPARING SEPARATORS OF INVENTION WITH PAPER SUPPORTED SEPARATORS UNDER CONDITIONS SHOWN
(Average of Three Cells in Each Case)

| Separator* | 2.25 Ohm LIF Serv. | | | 25 Ohm Radio Serv. | | |
|---|---|---|---|---|---|---|
| | 1.1v | 0.9v | 0.65v | 1.1v | 0.9v | 0.65v |
| | FRESH CELLS | | | | | |
| IB | 367 | 633 | 871 | 130 | 152 | 175 |
| Paper | 361 | 619 | 839 | 127 | 138 | 163 |
| IA | 359 | 604 | 863 | 130 | 149 | 172 |
| | AFTER STORAGE 1 WEEK AT 71° C. | | | | | |
| IB | 288 | 555 | 831 | No tests | | |
| Paper | 235 | 509 | 802 | | | |
| | AFTER 3 MONTHS AT 45° C. | | | | | |
| IB | 295 | 555 | 840 | No tests | | |
| Paper | 256 | 542 | 823 | | | |
| | AFTER 6 MONTHS AT 45° C. | | | | | |
| IB | 268 | 512 | 828 | No tests | | |
| Paper | 226 | 491 | 828 | | | |

*Notes:
IB is Beta glass carrier 1.5 mils thick with 100 $mg/in^2$ layer of mix B
IA is Beta glass carrier 1.5 mils thick with 100 $mg/in^2$ layer of mix A From the foregoing data it may be seen that cells containing the separator of the invention generally showed better service performance than similar cells equipped with conventional paper supported cells under all test conditions including after storage at elevated temperatures.

Other factors noted in the tests included the observation that gassing was much less evident in cells of the invention. Lowering of gassing makes possible a reduction in the quantity of mercuric chloride necessary in the cells. Of course this is a decided advantage from the standpoint of environmental pollution as well as of cost. An advantage of the open type structure of the nonwoven web is improved ionic diffusion and less increase in internal electrical resistance. Cells with the separator of the invention showed less tendency to can perforation and exudation of cell reaction products than did the cells provided with a paper-supported separator of substantially the same composition.

What is claimed is:

1. A battery separator comprising a layer of electrolyte-immobilizing partially cross-linked polyacrylamide
   and a carrier for said layer composed of a thin, nonwoven, bonded glass fiber web, containing glass fibers having a diameter of 2 to 8 microns and an individual length of one sixteenth to one half inch, said separator being about 2 to 7 mils in average overall thickness,
   and said carrier being about 1 to 3 mils in thickness.
2. A battery separator as defined in claim 1 wherein said electrolyte-immobilizing layer includes a bulking agent.
3. A battery separator as defined by claim 2 wherein said bulking agent is a mineral silicate selected from the group consisting of talc, fibrous talc, and asbestos.
4. A battery separator as defined by claim 1 wherein said electrolyte-immobilizing layer additionally includes a chromium-containing compound wherein a major portion of the chromium is present at a valence other than +3, and a compound which will react with said chromium-containing compound to yield chromium ion at a valence of +3.
5. A battery separator as defined by claim 1 in which said carrier is embedded in said layer.
6. A battery separator as defined by claim 5 wherein said polyacrylamide electrolyte-immobilizing layer includes a gelled solution of polyacrylamide in aqueous electrolyte.
7. A battery separator as defined by claim 6 wherein said electrolyte-immobilizing layer includes a bulking agent.
8. A battery separator as defined by claim 7 wherein said bulking agent is a mineral silicate selected from the group consisting of talc, fibrous talc, and asbestos.
9. A battery separator as defined by claim 8 wherein said bulking agent is talc.
10. A battery separator as defined by claim 9 wherein the ratio of said talc to said polyacrylamide is between about 5 to 1 and 10 to 1.

* * * * *